United States Patent
Davila (10) Patent No.: US 10,414,249 B2
(45) Date of Patent: Sep. 17, 2019

(54) TEMPORARY AUTOMOTIVE WINDOW COVERING

(71) Applicant: Gloria O. Davila, San Antonio, TX (US)

(72) Inventor: Gloria O. Davila, San Antonio, TX (US)

( * ) Notice: Subject to any disclaimer, the term of this patent is extended or adjusted under 35 U.S.C. 154(b) by 204 days.

(21) Appl. No.: 15/623,098

(22) Filed: Jun. 14, 2017

(65) Prior Publication Data
US 2018/0361833 A1    Dec. 20, 2018

(51) Int. Cl.
| | | |
|---|---|---|
| *B60J 1/20* | (2006.01) | |
| *B60J 1/08* | (2006.01) | |
| *B60J 11/08* | (2006.01) | |
| *B60J 1/00* | (2006.01) | |

(52) U.S. Cl.
CPC .............. *B60J 1/2094* (2013.01); *B60J 1/006* (2013.01); *B60J 1/085* (2013.01); *B60J 11/08* (2013.01)

(58) Field of Classification Search
CPC . B60J 1/085; B60J 1/2094; B60J 1/006; B60J 1/025; B60J 1/04; B60J 1/08; B60J 11/04; B60J 11/08; E06B 5/10; E06B 5/103; E06B 5/12
See application file for complete search history.

(56) References Cited

U.S. PATENT DOCUMENTS

| | | | | |
|---|---|---|---|---|
| 1,871,101 A | * | 8/1932 | Waltz | B63B 19/24 135/115 |
| 2,646,118 A | * | 7/1953 | Berty | B60J 11/08 160/369 |
| 2,679,467 A | * | 5/1954 | Sherts | B32B 17/10036 156/101 |
| 2,682,427 A | * | 6/1954 | Bright | B60J 5/0487 135/117 |
| 2,937,700 A | * | 5/1960 | Gibbons | B60J 1/2011 160/237 |

(Continued)

OTHER PUBLICATIONS

Andrew, William; Retrieved from the Internet: "What is a temporary fix for a broken car window?"; <https://www.reference.com > Vehicles > Car Parts & Maintenance>, Jun. 13, 2017.

(Continued)

*Primary Examiner* — Beth A Stephan
(74) *Attorney, Agent, or Firm* — Lincoln Law School of San Jose (57) ABSTRACT

A window repair apparatus for covering a window of automobile door is disclosed. Embodiments include a transparent sheet ranging from approximately 1.3 to approximately 1.5 times the size of the window region of the automobile door frame. The sheet has a plurality of holes on the top, leading, and trailing edges, and a slit in the corner to receive a side view mirror. The sheet is held in place by inserting the side view mirror through the slit and attaching the hook-and-loop fastener along the bottom edge of sheet to the hook-and-loop fastener on the outer side of door frame just below the window section of the door frame. The transparent sheet is wrapped around the side edges and top edge of the window section of door frame and all the edges are tied up with plurality of fasteners onto the inside of the window section of the door frame.

7 Claims, 10 Drawing Sheets

(56) References Cited

U.S. PATENT DOCUMENTS

| | | | | |
|---|---|---|---|---|
| 2,979,129 | A * | 4/1961 | Ketchum | B60J 11/08 160/370.21 |
| 3,336,969 | A | 8/1967 | Ransom et al. | |
| 3,749,147 | A * | 7/1973 | Hess | B60J 1/2011 160/105 |
| 4,562,666 | A * | 1/1986 | Young, III | E05B 13/001 49/463 |
| 4,682,447 | A * | 7/1987 | Osborn | A47G 21/167 52/3 |
| 4,889,754 | A * | 12/1989 | Vargas | B32B 7/06 428/41.4 |
| 5,035,460 | A * | 7/1991 | Huang | B60J 11/08 160/370.21 |
| 5,121,957 | A * | 6/1992 | O'Shea | B60J 1/025 160/370.21 |
| 5,292,167 | A * | 3/1994 | Hellman | B60J 11/08 150/168 |
| 5,524,694 | A * | 6/1996 | Arapis | B60J 1/2011 160/354 |
| 5,713,624 | A * | 2/1998 | Tower | B60J 1/2011 119/712 |
| 5,879,048 | A * | 3/1999 | Tower | B60J 1/2011 119/712 |
| 6,063,477 | A * | 5/2000 | Ames | B60J 1/025 428/192 |
| 6,076,577 | A * | 6/2000 | Ontaneda | B60J 11/08 150/168 |
| 6,145,573 | A * | 11/2000 | Chen | B60J 1/2011 160/368.1 |
| 6,352,299 | B1 * | 3/2002 | Ames | B60J 1/025 296/136.07 |
| 6,367,536 | B1 * | 4/2002 | St Louis | B60J 1/2011 160/352 |
| 6,648,396 | B2 * | 11/2003 | Monahan | B60J 1/2011 160/370.21 |
| 6,869,125 | B2 * | 3/2005 | Hamm | B60J 5/065 296/83 |
| 6,869,127 | B2 * | 3/2005 | Dohle | B60J 1/08 160/354 |
| 7,147,263 | B2 * | 12/2006 | Schneidau | B60J 1/20 296/77.1 |
| 7,793,581 | B2 * | 9/2010 | Erskine | B32B 17/10036 89/36.04 |
| 8,215,370 | B2 * | 7/2012 | Erdahl | B60J 1/20 160/372 |
| 8,610,992 | B2 | 12/2013 | Varaprasad et al. | |
| 8,967,228 | B2 * | 3/2015 | Sabb | B60J 1/025 160/180 |
| 9,352,636 | B1 * | 5/2016 | Johnson | B60J 1/20 |
| 9,352,637 | B1 * | 5/2016 | Rabb, Jr. | B60J 11/08 |
| 9,387,921 | B1 * | 7/2016 | Hogsette, Jr. | B64C 1/1461 |
| 9,393,856 | B2 * | 7/2016 | Ogilvie | B60J 1/20 |
| 2002/0024232 | A1 | 2/2002 | Ames et al. | |
| 2004/0058104 | A1 | 3/2004 | Farley et al. | |
| 2004/0222662 | A1 | 11/2004 | Dohle et al. | |
| 2015/0013862 | A1 * | 1/2015 | Nomura | B60J 11/08 150/168 |
| 2015/0047797 | A1 * | 2/2015 | Weyer | B60J 1/2094 160/370.21 |
| 2016/0200180 | A1 * | 7/2016 | Joao | B60J 11/08 160/370.21 |
| 2018/0072137 | A1 * | 3/2018 | Mitchell | B60J 1/085 |

OTHER PUBLICATIONS

Retrieved from the Internet: <www.autozone.com> . . . > Interior Accessories > Sun / Heat Protection > Window Tint>; Jun. 13, 2017.
Bridges, Rochelle; nautspill.com/2015/05/.../how-to-perform-a-temporary-fix-for-broken-side-car-wind; May 28, 2015.

\* cited by examiner

TEMPORARY AUTOMOTIVE WINDOW COVERING

TECHNICAL FIELD

The present disclosure generally relates to automotive accessories, and more specifically, to the temporary replacement window for an automobile.

BACKGROUND

Drivers are often unable to immediately replace a broken window, leaving a vehicle interior vulnerable to weather damage. Interior damage resulting from a broken window left unattended can cost several times more than window repair alone. Conventional methods relying on duct tape and plastic garbage bags are unreliable and can cause additional damage. For example, duct tape can cause severe damage to vehicle paint.

SUMMARY

Embodiments of the technique disclosed herein can provide a covering for a damaged window of automotive door. A window repair apparatus containing a substantially quadrangular sheet of transparent material can be used for covering an automobile window. A size of the quadrangular sheet can range, for example, from approximately 1.3 to approximately 1.5 times of the size of the window section of automotive door frame.

The sheet of transparent material has a top edge, a bottom edge, a leading edge, and a trailing edge. The sheet of transparent material includes a plurality of holes along the top edge, leading edge, and trailing edge. Dimensions of the sheet of transparent material can exceed dimensions of a window section of a door frame of an automobile. Dimensions of the sheet of transparent material include a length of a top edge, a length of a bottom edge, a length of a leading edge, and a length of a trailing edge. In an embodiment, dimensions of the sheet of transparent material are less than twice the dimensions of a window section of a door frame of an automobile. An area of the sheet of transparent material can exceed an area of a window section of the door frame. For example, the sheet of transparent material can cover a portion of a first side of the door frame and a top edge, leading edge, and trailing edge of the transparent material can wrap around to an opposite side of the door frame. Dimensions of the sheet of transparent material may not exceed twice the length of dimensions of the door frame. For example, the leading edge, the trailing edge, and the top edge may not overlap if the transparent sheet is wrapped around the window section of the door frame.

The transparent sheet has a slit in the corner for allowing the insertion of a side view mirror. The window repair apparatus has pair of detachable fasteners, one with hooks and the other with loops as a fastening mechanism. The window repair apparatus also has a group of detachable fasteners, one group has hooks and the other group has loops as a fastening mechanism.

The detachable fastener with hooks fastening mechanism is attached to the bottom edge of the transparent sheet using adhesive material and the other detachable fastener with loops fastening mechanism is attached to the outer side of the door frame slightly below the window section of the door frame. The transparent sheet is held in place by lining up with the slit in the corner of the sheet to insert the side view mirror and then lining up the fastener attached to the bottom edge of the transparent sheet to the fastener mounted on the door and pressing it snug fit to interlock the fasteners by hook-and-loop fastening mechanism to secure the transparent sheet onto the door frame. The leading edge, and trailing edge are wrapped around the window section and tied up together with the fasteners onto the inside of the window section of the door frame. The top edge of the transparent sheet is wrapped over the top of the window section frame and tied up vertically using fasteners to the interlocked fasteners horizontally tying up wrapped leading and trailing edges of the transparent sheet.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Embodiments of the present disclosure relate to a repair apparatus for temporary replacement of a broken window. The repair apparatus can include, for example, a transparent sheet and an attachment mechanism. The transparent sheet can be affixed to an automobile door using the attachment mechanism. Various embodiments are discussed below.

Figure 1:
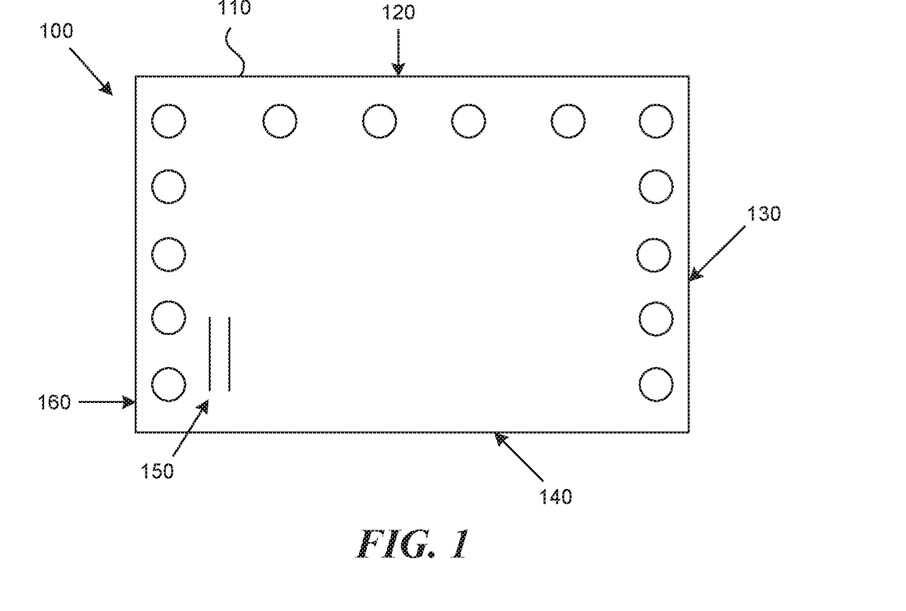
FIG. 1 illustrates a front view of quadrangular transparent sheet having a plurality of holes along the top edge, leading edge, trailing edge and a slit for a side view mirror in the corner of leading and bottom edges.

FIG. 1 shows a front view of a transparent sheet 100. The transparent sheet 100 can have a quadrangular shape. For example, the transparent sheet can include a top edge 110, a trailing edge 120, a bottom edge 130, and a leading edge 150.

The transparent sheet includes a first set of plurality of holes 102 along the top edge 110, a second set of plurality of holes 103 along the trailing edge 120 and a third set of plurality of holes 106 along the leading edge 150. The fasteners are passed through the plurality of holes along the leading, trailing and top edges of the transparent sheet and with the hook-and-loop fastening mechanism, the fasteners interlock and thereby secure the transparent sheet wrapped around the window section of the automotive door frame. The prior art referenced did not use this type of fastening mechanism to hold the sheet in place.

A slit 140 for the insertion of side view mirror is shown in the corner of the leading edge and bottom edge of transparent sheet. The slit is about 5×3 inches in size and is adjustable to various mirrors. The side view mirror is inserted through the slit before the transparent sheet is fixed to the front side of the door frame and top edge, trailing edge and the leading edge is wrapped around the edges of the window section of the automotive door frame.

The transparent sheet 100 can be composed of, for example, polyethylene terephthalate, cellulose acetate butyrate, polycarbonate, polymethlamethacrylate, or any combination thereof. For example, the transparent sheet 100 can include polyethylene terephthalate having an amorphous crystalline structure and include a particle size of less than 500 nm. Forming the transparent sheet 100 can include synthesizing monomer bis (2-hydroxyethyl) terephthalate by an esterification reaction between terephthalic acid and ethylene glycol with water as a byproduct, or by transesterification reaction between ethylene glycol and dimethyl terephthalate with methanol as a byproduct.

The transparent sheet 100 can be water resistant or water proof. The transparent sheet 100 can serve as a gas barrier. The transparent sheet 100 can be semi-rigid to rigid. The transparent sheet 100 can be impact-resistant.

Figure 2:
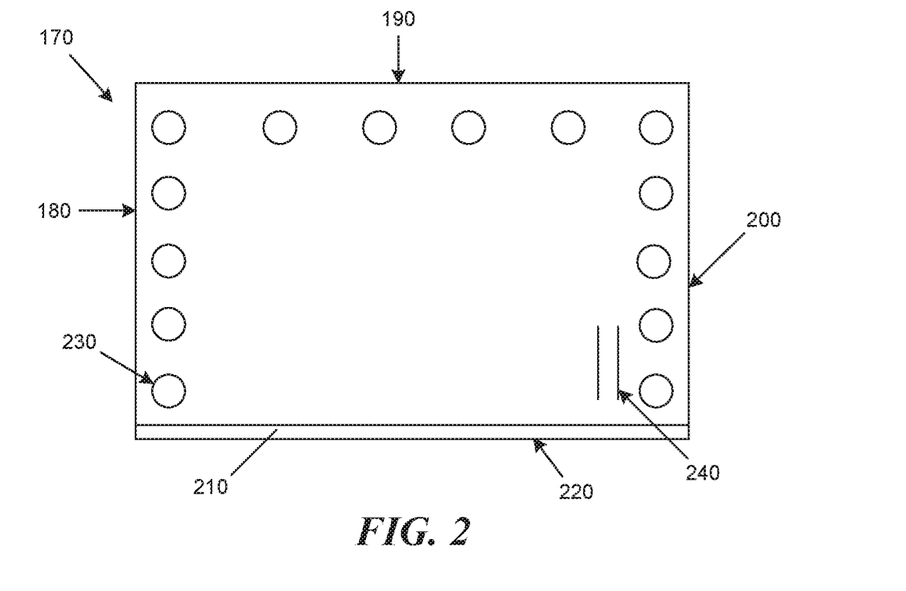
FIG. 2 illustrates a rear view of quadrangular transparent sheet containing a plurality of holes along the top edge, leading edge, trailing edge and a slit for the side view mirror in the corner. A detachable fastener with a fastening mechanism is attached along the bottom edge.

FIG. 2 shows a rear view of transparent sheet 170 (e.g., 100 as in FIG. 1). The transparent sheet 170 has a top edge 180, a leading edge 190, a bottom edge 200, and a trailing edge 230. The sheet has a hook-and-loop fastener 220 attached across the bottom edge. The sheet has a first set of plurality of holes 102 along the top edge 180, a second set of plurality of holes 106 along the leading edge 190 and a third set of plurality of holes 103 along the trailing edge 230. A slit 210 (e.g., 140 as in FIG. 1) for the insertion of side view mirror.

Figure 3:
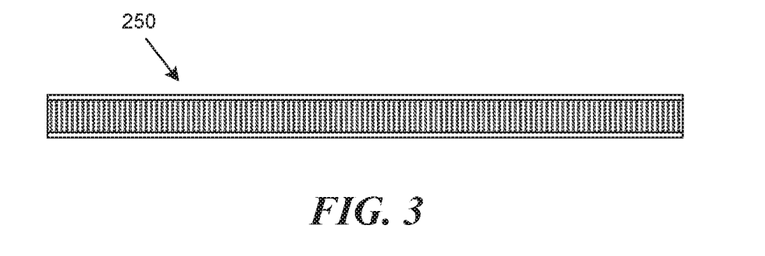
FIG. 3 illustrates a detachable fastener with hook fastening mechanism for attachment along the bottom edge of the transparent sheet.

FIG. 3 of the window repair apparatus shows a detachable hook-and-loop fastener 250 with hooks as a fastening mechanism. The detachable hook-and-loop fastener 250 is about 2 inches in width. It is attached across the bottom edge of the transparent sheet. For example, an adhesive can be used to attach the hook-and-loop fastener 250 across the bottom edge of the transparent sheet. In another example, the hook-and-loop fastener 250 can be fused to the bottom edge of the transparent sheet using, for example, hot gas welding, speed tip welding, extrusion welding, contact welding, hot plate welding, high frequency welding, induction welding, injection welding, ultrasonic welding, friction welding, spin welding, laser welding, solvent welding, or any combination thereof.

Figure 4:
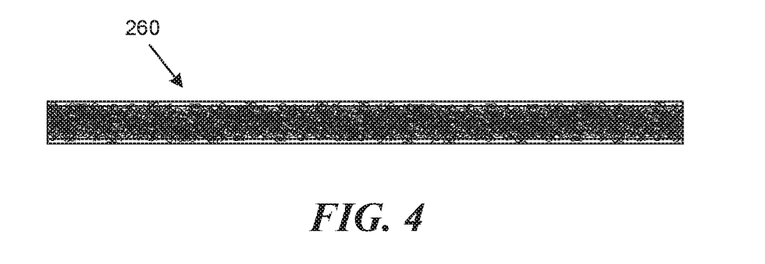
FIG. 4 illustrates a detachable fastener with loop fastening mechanism for attachment along the front side of the door frame.

FIG. 4 of the window repair apparatus shows a detachable hook-and-loop fastener 260 with loops as a fastening mechanism. It is about 2 inches in width. The hook-and-loop fastener can be, for example, attached to door frame on the outer side just below the window section by gluing it to the door frame using adhesive material. The detachable hook-and-loop fastener can also be attached to door frame on the outer side just below the window section by attaching suction cups to the detachable fastener and pressing the fastener onto these cups to attach the fastener to the door. The other example of attaching the fastener to the door just below the window section on the outside would be to wrap the ends of detachable hook-and-loop fastener 260 around the door frame and tie it up on the inside of the door frame.

Figure 5:
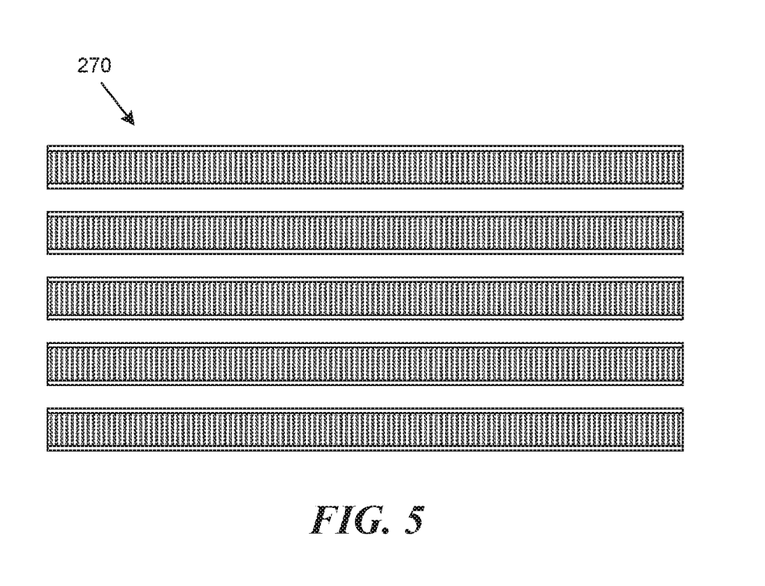
FIG. 5 illustrates a group of detachable fasteners with hook fastening mechanism for tying up the leading edge to the trailing edge and top edge to the interlocked fasteners tying up the leading and trailing edges of the transparent sheet.

FIG. 5 of the window repair apparatus shows a group of hook-and-loop fasteners 270 with hooks fastening mechanism which are about an inch in width and are used to fasten together the trailing edge and the leading edge of the transparent sheet wrapped on the inside of window section of door frame. The ends of the fasteners with hooks are passed through the holes along the trailing edge and the leading edge of the wrapped transparent sheet and each end is attached to the ends of fasteners with loops to interlock the leading and trailing edges together to hold the wrapped transparent sheet in place behind the window section of the door frame.

Figure 6:
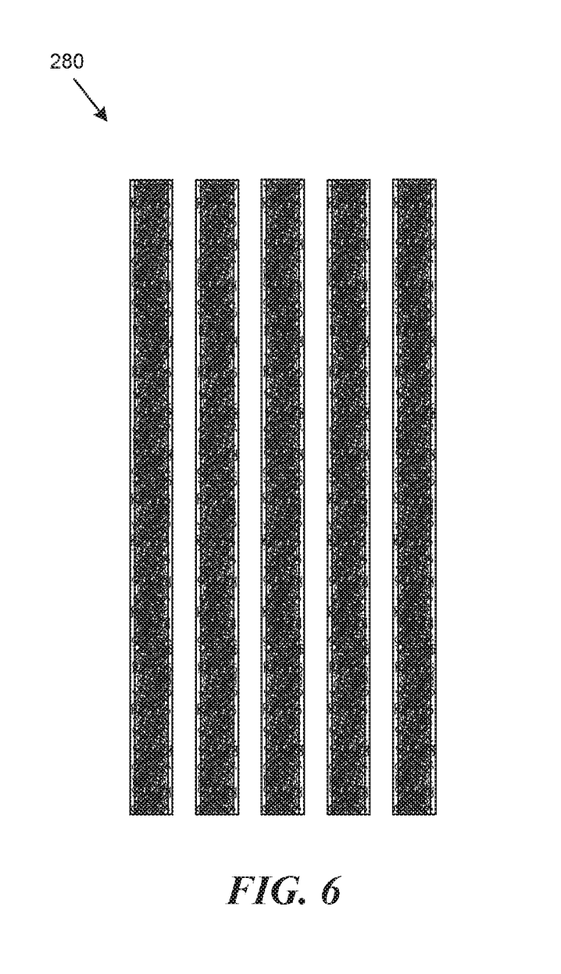
FIG. 6 illustrates a group of detachable fasteners with loop fastening mechanism for tying up the leading edge to the trailing edge and top edge to the interlocked fasteners tying up the leading and trailing edges of the transparent sheet.

FIG. 6 of the repair apparatus shows a group of hook-and-loop fasteners 280 with loops fastening mechanism. These fasteners are about an inch in width and are used to interlock the wrapped top edge of the transparent sheet to the fasteners used to tie up the wrapped leading edge and the trailing edge horizontally on the inside of window section of the door frame. The fasteners are passed through the holes along the top edge and wrapped around the fasteners used to tie together the leading edge and the trailing edge horizontally transparent sheet on the inside of the window section of the door frame. The fasteners are tied up together by interlocking of the hook-and-loop fastening mechanism and wrapped transparent sheet is held in place on the inside of the window section of the automotive door frame.

Figure 7:
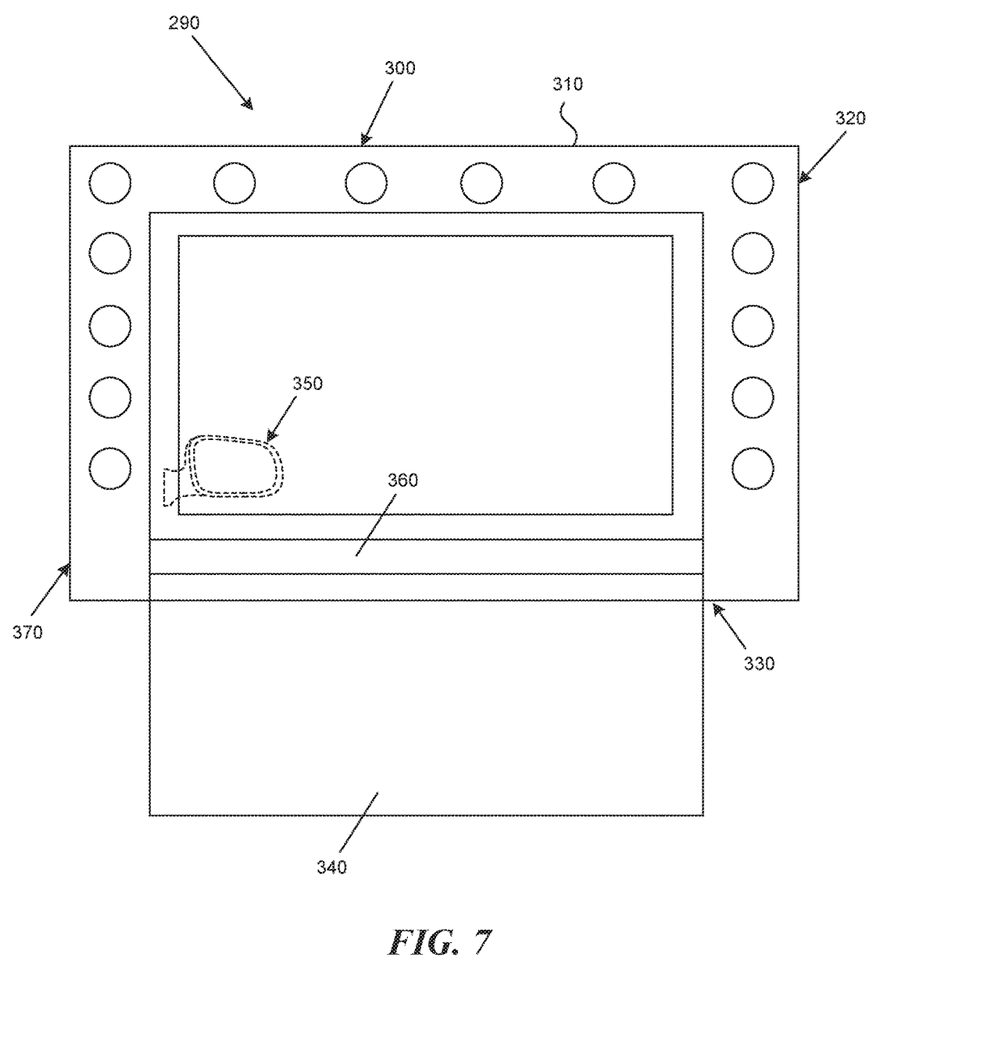
FIG. 7 illustrates a front view of the transparent sheet attached to the door frame on the outer side covering the window section before wrapping transparent sheet around the edges of the window section of door frame.

FIG. 7 shows a front view of transparent sheet 290 (e.g., 100 as in FIG. 1) attached to the window section of the door frame. The transparent sheet 290 has a leading edge 370, a trailing edge 320, a bottom edge 330, and a top edge 300. The transparent sheet 290 includes a first set of plurality of holes 102 along the top edge 300, a second set of plurality of holes 103 along the trailing edge 320, and a third set of plurality of holes 106 along the leading edge 370.

The transparent sheet 290 is held in place on the outside of the window section of door frame by inserting the side view mirror in the slit 350 (e.g., 140 as in FIG. 1) which is in the corner of the leading edge and the bottom edge of the transparent sheet 290 and lining up the hook-and-loop fastener strap 360 (e.g., 220 as in FIG. 2) along the bottom edge on the inside of the transparent sheet 290 onto the hook-and-loop fastener attached to the outer side of the door just below the window section of the door frame 340. The bottom edge of transparent sheet 330 is pressed on so that the detachable fastener attached to the outside of door frame just below the window section of the door frame and the fastener attached to the inside of the transparent sheet at the bottom edge with the hook-and-loop mechanism interlock and hold transparent sheet in place on the outside of the window section of the door frame.

Figure 8:
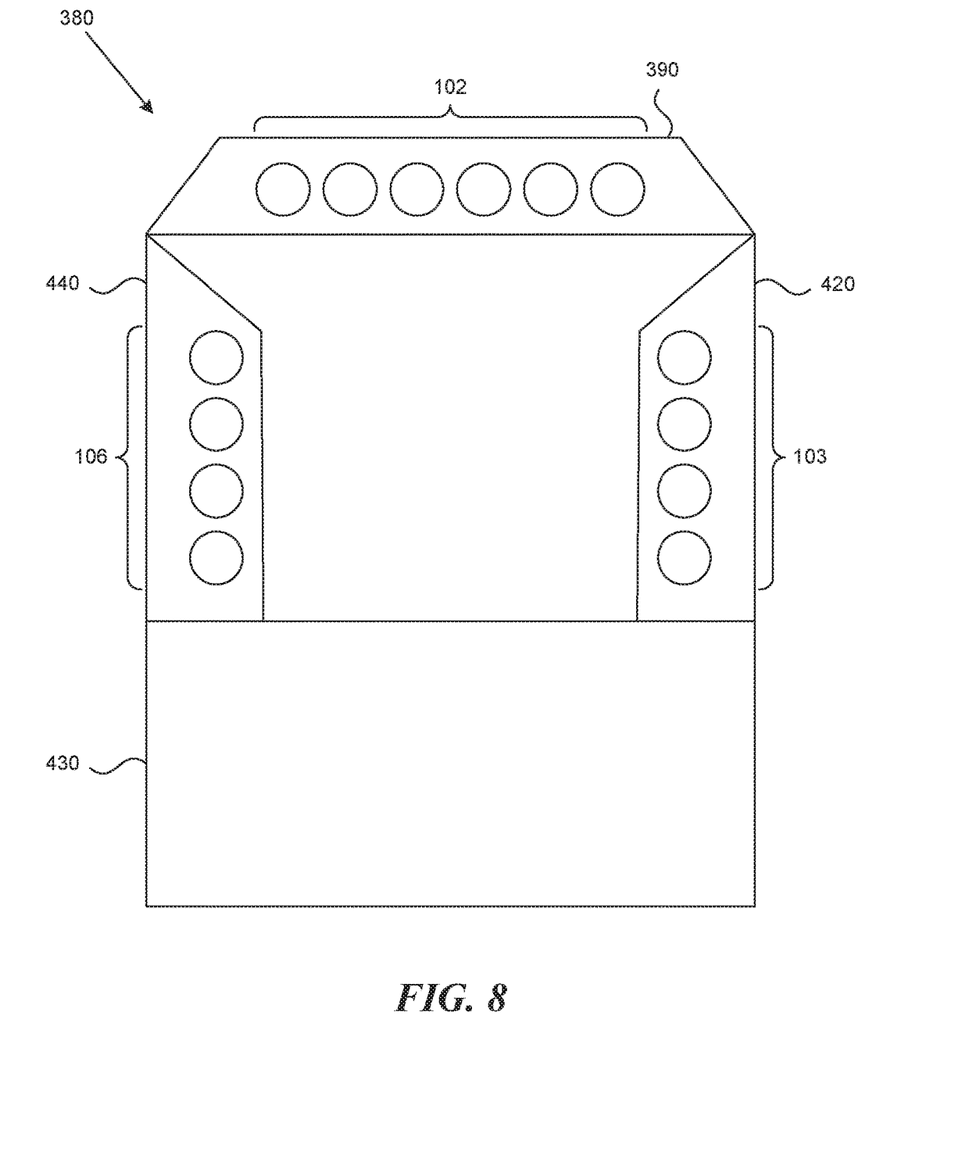
FIG. 8 illustrates an inside view of the window section of door frame wrapped with transparent sheet on the inside showing the corner portions on the top edge of the transparent sheet have been removed and the leading edge and trailing edge have been folded on the inside of the window section.

FIG. 8 shows an inside view of the transparent sheet 380 (e.g., 100 as in FIG. 1) attached on the outside of the window section of the automotive door frame. The corner portion 410 of the transparent sheet at the top edge 390 and the leading edge 420 and the corner portion 450 of the transparent sheet at the top edge 390 and the trailing edge 440 are have been removed to facilitate the wrapping of the leading edge and the trailing edge onto the inside of the window section of the door frame 430.

The transparent sheet top edge 390 has a first set of plurality of holes 102 along the top edge 390, a second set of plurality of holes 103 along the leading edge 420 and a third set of plurality of holes 106 along the trailing edge 440. The top edge 390 is seen unfolded while as the leading edge 420 and the trailing edge 440 are noticed folded onto the inside of the window section of the door frame 430.

Figure 9:
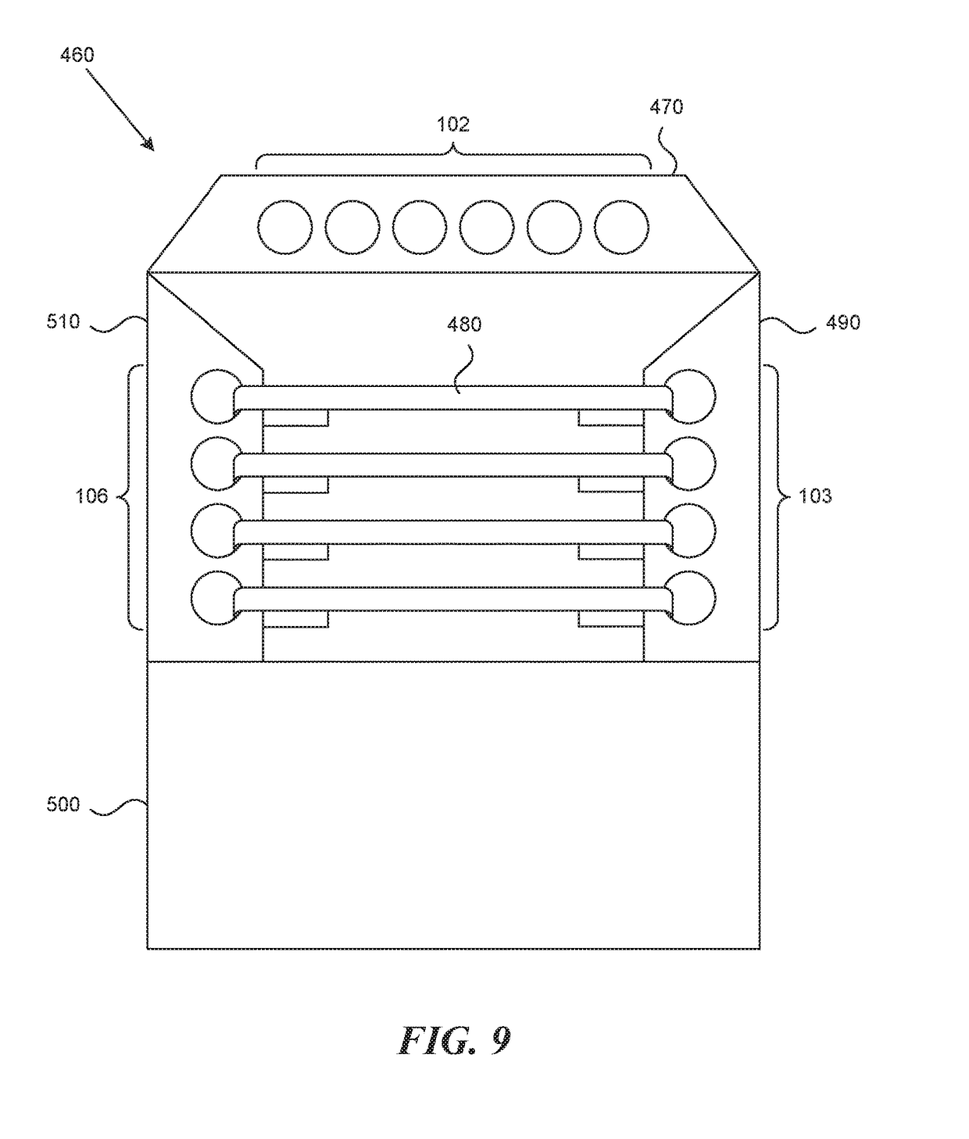
FIG. 9 illustrates a step in which fasteners with the loops fastening mechanism have been passed through the plurality of holes horizontally along the leading and trailing edges of transparent sheet.

FIG. 9 shows the inside view of transparent sheet 460 (e.g., 100 as in FIG. 1). The transparent sheet has a top edge 470, a leading edge 490 and a trailing edge 510. The corner portion 485 of top edge 470 and the leading edge 490 has been removed. The corner portion 520 of the top edge 470 and the trailing edge 510 has been removed. The top edge has a first set of plurality of holes 102, The leading edge 490 has a second set of plurality of holes 103 and the trailing edge 510 has a third set of plurality of holes 106. The top edge is not folded over on the inside of the top edge of the window section of door frame. The leading edge 490 and trailing edge 510 are seen folded over on the inside of the edges of the window section of the door frame.

The leading edge 490 and the trailing edge 510 of the transparent sheet 460 are seen folded over on the inside of the window section of the door frame and first group of hooks-and-loops fasteners 480 with hooks fastening mechanism have been passed through the holes along each of the leading and trailing edges horizontally. One end of each of the fastener with hooks fastening mechanism is passed through one of the holes along the leading edge and the other end of the same fastener is passed through the other hole on the opposite side along the trailing edge of the transparent sheet folded on the inside of the window section of a door frame. Following similar steps as taken above, each end of each fastener with hooks fastening mechanism is passed through the respective holes along the leading and trailing edges of the transparent sheet till each of the hole along the leading and trailing edges has a fastener passed through and all the holes along the leading edge and trailing edges in a similar manner as demonstrated for the first fastener are occupied with the first group of fasteners with hooks fastening mechanism.

Figure 10:
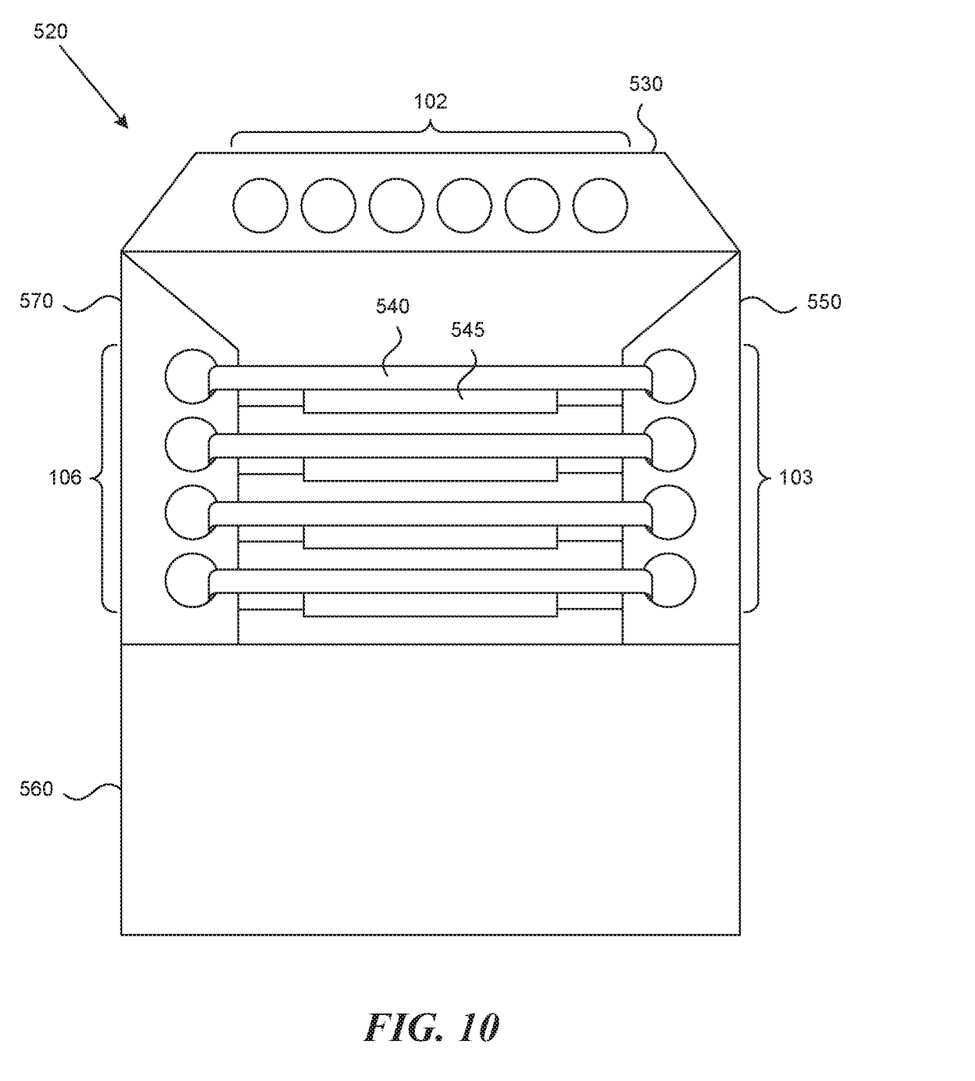
FIG. 10 illustrates a step in which complimentary fasteners with the hooks fastening mechanism are attached to the ends of fasteners with loops fastening mechanism horizontally to tie up leading and trailing edges of transparent sheet.

FIG. 10 shows the inside view of the transparent sheet 520 e.g., 100 as in FIG. 1). The transparent sheet has a top edge 530, a leading edge 550 and a trailing edge 570. The top edge 530 has first set of plurality of holes 102 and is not folded over the top edge and on the inside of window section of the door frame 560. The leading edge 550 has a second set of plurality of holes 103 and the trailing edge 570 has third set of plurality of holes 106. The corner portion 537 between the top edge 530 and the leading edge 550 has been removed. The corner portion 578 between the top edge 530 and the trailing edge 570 has been removed.

The transparent sheet 520 leading edge 550 and the trailing edge 570 are folded in around the edges of the window section of the door frame 560. The first group of fasteners 540 with hooks fastening mechanism have been passed through the plurality of holes 103 along the leading edge 550 and the plurality of holes 106 along the trailing edge 570. The first group of fasteners with hooks fastening mechanism are interlocked with the second group of complimentary fasteners 545 with loops fastening mechanism horizontally, thereby tying up the leading and trailing edges together.

The ends of the first group of fasteners with hooks fastening mechanism which is seen passed through respective opposite holes along the leading and trailing edges are attached to the ends of second group of complimentary fasteners with loops fastening mechanism. The ends of first fasteners are pulled together and each end of second complimentary fastener is attached to each end of first fastener to tie up the leading and trailing edges by interlocking hooks-and-loops fastening mechanism of the fasteners. Following similar steps as taken above, each of the ends of all the remaining first group of fasteners along the leading and trailing edges are attached to each of the ends of second group of complimentary fasteners and the leading and trailing edges are tied up horizontally to secure transparent sheet in place as wrapped around the edges on the inside of the window section of the door frame.

Figure 11:
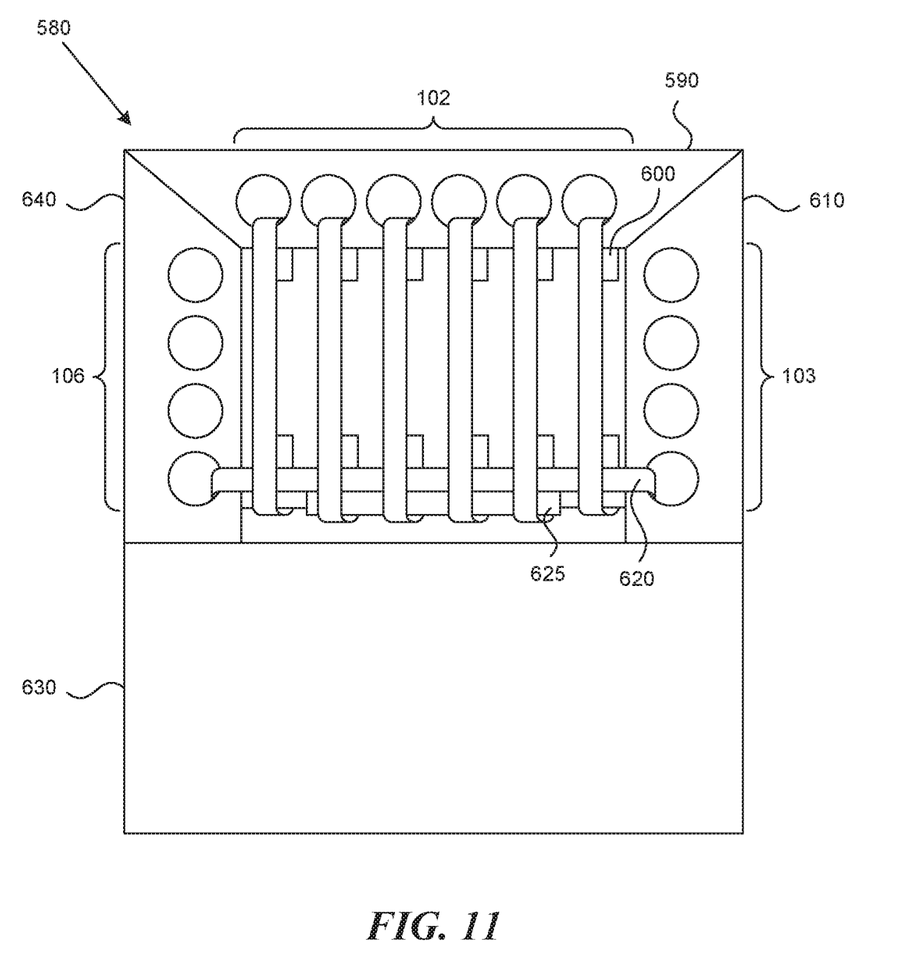
FIG. 11 illustrates a step in which fasteners with loops fastening mechanism are passed through the plurality of holes vertically along the top edge and wrapped around the fasteners tying up the leading and trailing edges of the transparent sheet.

FIG. 11 shows the inside view of the transparent sheet 580 (e.g., 100 as in FIG. 1) wrapped around the window section of the door frame 630. The transparent sheet has a top edge 590, a leading edge 610 and a trailing edge 640. The top edge 590 has a first set of plurality of holes 102. The leading edge 610 has a second set of plurality of holes 103. The trailing edge 640 has a third set of plurality of holes 106. The top edge 590 of the transparent sheet is seen folded over the top edge on the inside of the window section of the automotive door frame 630. The leading edge 610 and trailing edge 640 of the transparent sheet are also seen folded over on the inside of window section of door frame 630.

The leading edge 610 and trailing edge 640 of the transparent sheet have been folded over on the inside around the edges of the window section of the door frame and tied up with the first and second group of fasteners. The top edge 590 of the transparent sheet 580 is folded on the inside of the window section of the door frame 630 and is tied up with the first group of fasteners and second group of complimentary fasteners to the first groups of fasteners and second group of complimentary fasteners with which the leading and trailing edges have been tied up due to interlocking of fasteners with hooks-and-loop fastening mechanism.

One end of the first group of fasteners 600 with hook fastening mechanism is passed through the hole along the top edge of the transparent sheet vertically and the other end is passed around the interlocked first group and second group of complimentary fasteners horizontally, which in turn tie up the leading edge 610 and the trailing edge 640 of the transparent sheet wrapped around the edges of the window section of the automotive door frame 630. Following similar steps as taken above, each end of each of the first strap is passed through the respective holes vertically along the top edge of the transparent sheet and the other end is wrapped around the interlocked fasteners horizontally, till each end of each first group of fastener is passed through each of the hole along the top edge vertically and the other end is wrapped around the interlocked fasteners with hooks-and-loops fastening mechanism tying up horizontally leading and trailing edges of the transparent sheet wrapped around the window section of door frame.

Figure 12:
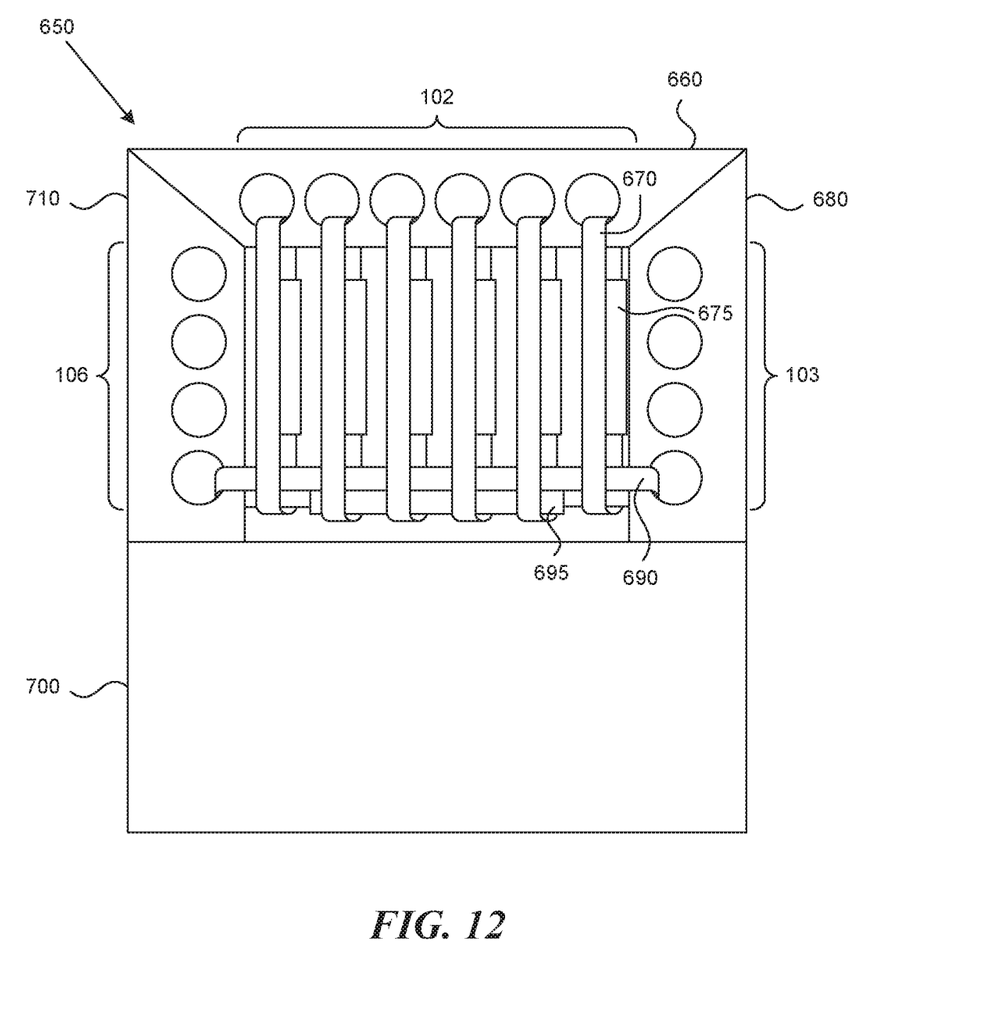
FIG. 12 illustrates, the step in which complimentary fasteners with hooks fastening mechanism are attached to the ends of the fasteners with loop fastening mechanism vertically to tie up the top edge to interlocked fasteners tying up leading and trailing edges of the transparent sheet.

FIG. 12 shows the inside view of window section wrapped around by the transparent sheet 650 (e.g., 100 as in FIG. 1). The transparent sheet has a top edge 660, a leading edge 680 and a trailing edge 710. The top edge 660 has a first set of plurality of holes 102 and is seen folded on the inside over the top edge of the window section of the door frame 700. The leading edge 680 has a second set of plurality of holes 103. The trailing edge 710 has a third set of plurality of holes 106. The leading edge 680 and the trailing edge 710 are seen folded on the inside over the edges of window section of a door frame 700.

The leading edge 680 and trailing edge 710 of the transparent sheet have been folded on the inside of window section of the door frame and tied up horizontally with fasteners interlocked with hook-and-loop fastening mechanism. The top edge 660 of the transparent sheet 650 is folded on the inside over the top edge of the window section of the door frame 700 and is tied up vertically with the first group of fasteners 670 and second group of complimentary fasteners 675 passing through the holes along the top edge and wrapped around the interlocked fasteners horizontally which in turn tie up the leading and trailing edges of the transparent sheet of the window section of the door frame 700.

One end of each of the first group of fasteners with hook fastening mechanism is passed vertically through the hole along the top edge of the transparent sheet and the other end is passed around the interlocked first and second group of complimentary fasteners tying up horizontally, the leading and trailing edges of the transparent sheet. The ends of each of the first group of fasteners 670 are attached to each of the end of second group of complimentary fasteners 675. The ends of the first group of fasteners are pulled together to attach the ends of second group of complimentary fasteners with hook-and-loop fastening mechanism the top edge and the interlocked fasteners tying up the leading and trailing edges are tied up. Following similar steps as taken above, the remaining ends of each of the first group of fasteners with hooks fastening mechanism are also attached to each of the end of second group of fasteners with loops fastening mechanism. In the same manner as described above each end of the first group fastener is pulled together and each end of second group of complimentary fasteners is attached to each end of first group of fasteners vertically. The top edge and the interlocked first and second group of complimentary fasteners tying up horizontally the leading edge and trailing edge are tied together due to hook-and-loops mechanism of fasteners.

Figure 13:
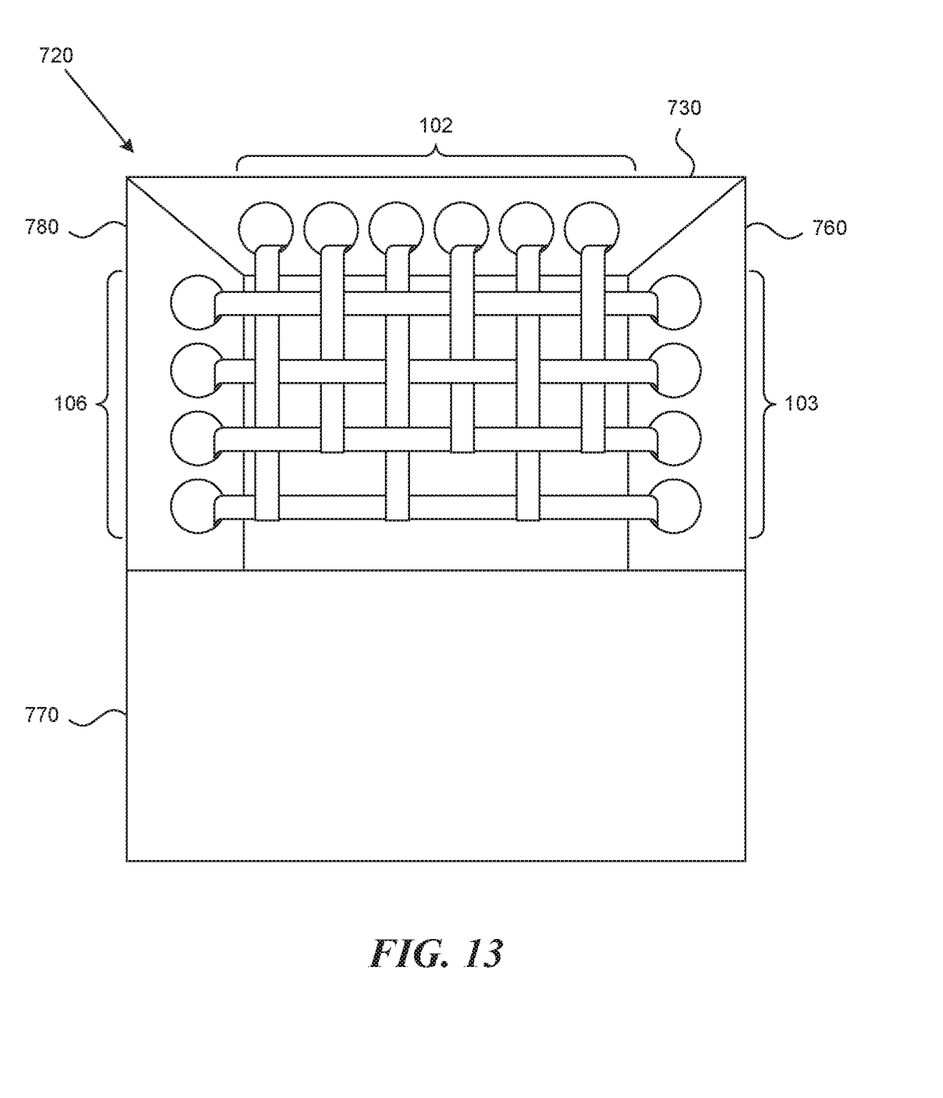
FIG. 13 illustrates the inter-cross pattern of plurality of fasteners with loops-and-hooks fastening mechanism tying up the leading and trailing edges horizontally and plurality of fasteners with loops-and-hooks fastening mechanism tying up vertically the top edge to the interlocked fasteners tying up leading and trailing edges of the transparent sheet.

FIG. 13 shows inside view of the transparent sheet 720 (e.g., 100 as in FIG. 1) wrapped around on the inside of window section of the door frame 770. The transparent sheet has a top edge 730, a leading edge 760 and a trailing edge 780. The top edge 720, leading edge 760 and the trailing edge 780 are folded in on the inside of the window section of the door frame 770. The top edge 730 has a first set of plurality of holes 102, the leading edge 760 has second set of plurality of holes 103 and the trailing edge 780 has a third set of plurality of holes 106. The leading and the trailing edges are tied up horizontally by first group of fasteners and second group of complimentary fasteners interlocked with hooks-and-loop fastening mechanism. The top edge 730 is tied up vertically to the interlocked first and second group of complimentary fasteners tying up the leading and trailing edges.

The first group of fasteners are used to fasten the folded in leading and trailing edges of the transparent sheet. One end of a first group of fastener with hook fastening mechanism is passed through the hole along the leading edge 760 and the other end is passed through the trailing edge 780 of the transparent sheet wrapped around the leading and trailing edge of the window section of the door frame 770. The ends of each first group of fastener with hooks fastening mechanism are attached to ends of second group of complimentary fasteners with loop fastening mechanism. The hooks-and-loop fastening mechanism interlocks the first and second group of fasteners and provides firm grip to the leading and trailing edges of the transparent sheet. This process is repeated till the leading edge and the trailing edge are tied up by passing through first group of fasteners with hook fastening mechanism through each hole along the leading edge and trailing edge and the ends of the first group fastener are attached to the ends of second complimentary fastener are attached to the end of first group fastener and with hooks-and-loop mechanism the first and second group of complimentary fasteners get interlocked tying up the leading and trailing edges and transparent sheet is secured in place.

The first and second group of complimentary fasteners are used to fasten the folded in top edge of the transparent sheet to the interlocked first and second group of fasteners tying up the leading and trailing edges of the transparent sheet. One end of a first strap with hooks fastening mechanism is passed through the hole along the top edge 730 and the other end is passed around each of the interlocked straps tying up the leading edge 760 and trailing edge 780 of the transparent sheet wrapped around the leading and trailing edge of the window section of the door frame 770. The ends of second group strap with loops fastening mechanism are attached to the ends of the first strap. The hooks-and-loops fastening mechanism interlocks the first and second group of fasteners and provides firm grip between the top edge of the transparent sheet and the interlocked horizontal fasteners. All the steps taken above for the first group of fasteners are repeated till all the holes along the top edge have each of the end of each of first group of fastener passed through and each of the other end of each of first group of fasteners is wrapped around each of interlocked first group and second group of complimentary fasteners tying up the leading and trailing edges of the transparent sheet. The ends of each of the first group of fasteners with hooks fastening mechanism is attached to each of the end of second group of complimentary fasteners. The hook- and loops fastening mechanism ties up the top edge vertically to the interlocked first group and second group of complimentary fasteners horizontally tying up leading and trailing edges of the transparent sheet. The interlocked fasteners tying the leading and trailing edges horizontally cross every other interlocked fasteners tying the top edge vertically to the interlocked fasteners tying up leading and trailing edges horizontally. The inter-cross of first and second group of complimentary fasteners provides a firm grip to the transparent sheet wrapped around the window section of the door frame.

What is claimed is:

1. A repair kit for temporarily covering a damaged window on an automotive door comprising:

a sheet of a transparent material with a substantially quadrangular shape, the sheet having a top edge, a bottom edge, a leading edge, and a trailing edge;

the top edge, the leading edge, and the trailing edge containing each a plurality of holes;

a plurality of fasteners for affixing the sheet to the window, wherein the plurality of fasteners include horizontal hook and loop fasteners, the horizontal hook and loop fasteners being configured to connect the plurality of holes of the leading edge to the plurality of holes of the trailing edge;

wherein an area of the sheet is greater than an area of the window such that when the sheet is placed against a first side of the window, a portion of the top edge, a portion of the leading edge, and a portion of the trailing edge wrap from the first side of the window to a second side of the window;

wherein a length of the sheet is less than twice a length of the window.

2. The repair kit of claim 1, wherein the bottom edge of the sheet includes a detachable fastening mechanism.

3. The repair kit of claim 2, wherein the detachable fastening mechanism is a hook-and-loop mechanism.

4. The repair kit of claim 2, further comprising:
a second fastener for attaching the top edge of the sheet to the detachable fastening mechanism.

5. The repair kit of claim 4, wherein the second fastener is affixed to the window by an adhesive material.

6. The repair kit of claim 1, wherein the plurality of fasteners include vertical hook and loop fasteners, the vertical hook and loop fasteners being configured to connect the plurality of holes of the top edge to the horizontal hook and loop fasteners.

7. The repair kit of claim 1, wherein the sheet further includes a slit suitable for accommodating a side view door mirror.

* * * * *